(12) United States Patent
Partyka et al.

(10) Patent No.: US 9,945,237 B2
(45) Date of Patent: Apr. 17, 2018

(54) LOCK FOR RETAINING MINIDISKS WITH ROTORS OF A GAS TURBINE ENGINE

(71) Applicant: UNITED TECHNOLOGIES CORPORATION, Farmington, CT (US)

(72) Inventors: Julian Partyka, West Springfield, MA (US); Jonathan Perry Sandoval, Hebron, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 228 days.

(21) Appl. No.: 14/765,491

(22) PCT Filed: Dec. 18, 2013

(86) PCT No.: PCT/US2013/075993
§ 371 (c)(1),
(2) Date: Aug. 3, 2015

(87) PCT Pub. No.: WO2014/149104
PCT Pub. Date: Sep. 25, 2014

(65) Prior Publication Data
US 2015/0377041 A1    Dec. 31, 2015

Related U.S. Application Data

(60) Provisional application No. 61/798,933, filed on Mar. 15, 2013.

(51) Int. Cl.
*F01D 1/00* (2006.01)
*F01D 5/32* (2006.01)
(Continued)

(52) U.S. Cl.
CPC .......... *F01D 5/32* (2013.01); *F01D 5/02* (2013.01); *F01D 5/082* (2013.01); *F01D 5/12* (2013.01);
(Continued)

(58) Field of Classification Search
CPC ........ F01D 5/32; F01D 5/3015; F01D 5/3046; F01D 11/006; F01D 11/001;
(Continued)

(56) References Cited

U.S. PATENT DOCUMENTS 4,019,833 A * 4/1977 Gale .................... F01D 5/30
416/218
4,890,981 A * 1/1990 Corsmeier ............ F01D 5/3015
416/220 R
(Continued)

FOREIGN PATENT DOCUMENTS

EP    1048821 A2    11/2000
EP    1312756 B1    2/2001
(Continued)

OTHER PUBLICATIONS

International Search Report Application No. PCT/US2013/075993; dated Apr. 23, 2014.
(Continued)

*Primary Examiner* — Pascal M Bui Pho
*Assistant Examiner* — Edwin Kang
(74) *Attorney, Agent, or Firm* — Cantor Colburn LLP (57) ABSTRACT

In accordance with one aspect of the disclosure, a rotor is disclosed. The rotor may include a disk having a central axis, an airfoil radially extending from the disk, a bayonet tab extending radially from the disk, and a lock. The lock may further include a short tab and a long tab, both extending
(Continued)

radially from the disk and in an axial direction with respect to the central axis. The long tab may have a greater axial length than the short tab.

19 Claims, 9 Drawing Sheets (51) Int. Cl.
*F01D 5/08* (2006.01)
*F01D 5/30* (2006.01)
*F01D 5/02* (2006.01)
*F01D 5/12* (2006.01)
*F01D 11/00* (2006.01)
*F02C 3/04* (2006.01)

(52) U.S. Cl.
CPC ......... *F01D 5/3015* (2013.01); *F01D 5/3046* (2013.01); *F01D 11/006* (2013.01); *F02C 3/04* (2013.01); *F05D 2220/32* (2013.01); *F05D 2230/60* (2013.01); *Y02T 50/676* (2013.01)

(58) Field of Classification Search
CPC ............... F01D 11/005; F05D 2230/60; F05D 2230/64; F05D 2230/644; F05D 2240/55; F02C 7/28

See application file for complete search history.

(56) References Cited

U.S. PATENT DOCUMENTS 5,655,876 A * 8/1997 Rock ...................... F01D 9/041
415/138
2012/0003100 A1 1/2012 James et al.

FOREIGN PATENT DOCUMENTS

EP 1277917 A1 1/2003
EP 1357254 A2 10/2003

OTHER PUBLICATIONS

Written Opinon of the International Searching Authority for International Application No. PCT/US2013/075993, dated Apr. 23, 2014 6 Pages.

* cited by examiner

LOCK FOR RETAINING MINIDISKS WITH ROTORS OF A GAS TURBINE ENGINE

CROSS-REFERENCE TO RELATED APPLICATION

This patent application is a US National Stage under 35 U.S.C. § 371, claiming priority to International Application No. PCT/US2013/075993 filed on Dec. 18, 2013, which claims priority under 35 U.S.C. § 119(e) to U.S. Patent Application Ser. No. 61/798,933 filed on Mar. 15, 2013.

FIELD OF THE DISCLOSURE

The present disclosure generally relates to gas turbine engines and, more specifically, to locking mechanisms for rotors and their associated minidisks.

BACKGROUND OF THE DISCLOSURE

A gas turbine engine, typically used as a source of propulsion in aircraft, operates by drawing in ambient air, combusting that air with a fuel, and then forcing the exhaust from the combustion process out of the engine. In many gas turbine engines, a fan rotates to draw air into the engine; however, the fan is not a necessity for all gas turbine engines. A compressor section is disposed axially downstream of the fan and includes a plurality of axially aligned stages. Each of these stages includes a rotor, having a plurality of radially outwardly extending and rotating blades, and a stator, having a plurality of radially inwardly extending and stationary vanes. The rotor of each stage compresses air, while the stator realigns the air for optimal compression by the next stage. The compressed air flows from the compressor section through a diffuser and into the combustor, both of which are axially downstream of the compressor. At the combustor, a portion of the air is used to cool the combustor while the rest is mixed with a fuel and ignited.

An igniter generates an electrical spark in the combustor to ignite the air-fuel mixture. The products of the combustion then travel out of the combustor as exhaust and into a turbine section, which is axially downstream of the combustor. The turbine section, having low and high pressure turbines in dual-spool turbine designs, also has a plurality of axially aligned stages. Similar to the compressor, each of the turbine stages includes a stator, having a plurality of radially inwardly extending stationary vanes, and a rotor, having a plurality of radially outwardly extending and rotating blades. Each rotor of the turbine is forced to rotate as the exhaust impinges upon the blades, while each stator realigns the exhaust for optimal impingement upon the rotor of the next turbine stage. The fan, compressor section, and turbine section are connected by concentrically mounted engine shafts running through the center of the engine. Thus, as the turbine rotors are rotated by the exhaust, the fan and corresponding compressor rotors are also rotated to bring in and compress new air. Once started, it can thereby be seen that this process is self-sustaining.

The blades of each of these rotors are typically mounted to a central body or disk. In many rotors, a minidisk or seal is connected to and rotates with the body of the rotor. The minidisk and body of the rotor must be locked together to prevent axial and circumferential movement of the minidisk relative to the body of the rotor. Specifically, the first stage of the turbine aft of the combustor, typically has an air seal mounted to the disk of the rotor. This air seal prevents air from bypassing the combustor, except in specific locations where the air is used to cool the turbine sections.

Typically, a bayonet joint, such as the one described in the U.S. Pat. No. 5,468,210, prevents axial movement, while a separate joint prevents circumferential movement of this air seal, or any such minidisk associated with a rotor in such a manner. While effective, these separate joints increase the weight, part count, maintenance, and cost of the engine. The weight and part count of the engine must be kept at a minimum in aircraft applications for optimum efficiency, while the maintenance and cost of the engine are always more desirable when low, no matter the application.

SUMMARY OF THE DISCLOSURE

In accordance with one aspect of the disclosure, a rotor is disclosed. The rotor may include a disk having a central axis, a plurality of airfoils radially extending from the disk, a bayonet tab extending radially from the disk, and a lock. The lock may further include a short tab and a long tab, both extending radially from the disk and in an axial direction with respect to the central axis. The long tab may have a greater axial length than the short tab.

In a refinement, the short tab of the lock may have a greater axial length than an axial width of the bayonet tab.

In another refinement, a circumferential distance around the disk separating the bayonet tab and the lock may be equal to a circumferential distance around the disk separating the short and long tabs of the lock.

In another refinement, the bayonet tab, short tab, and long tab may extend radially outward from the disk of the rotor with respect to the central axis.

In yet another refinement, a plurality of locks may be evenly distributed about the circumference of the disk.

In yet another refinement, a plurality of bayonet tabs may be evenly distributed about the circumference of the disk.

In still another refinement, a minidisk may be operatively associated with the rotor and include a locking tab positioned between the short and long tabs of the lock of the rotor.

In a further refinement, the minidisk may have a second locking tab proximate the bayonet tab of the rotor.

In another further refinement, a plurality of locking tabs may be evenly distributed about the circumference of the minidisk.

In still another further refinement, the rotor may be a turbine of a gas turbine engine and the minidisk may be an air seal.

In still another refinement, the lock may further include a connector spanning between and joining the short and long tabs of the lock.

In accordance with another aspect of the present disclosure, a method of assembling a rotor and a minidisk is disclosed. The method may include aligning a locking tab on the minidisk with a space separating a bayonet tab and a lock of the rotor and then moving the minidisk in a first direction such that the locking tab of the minidisk moves through the space separating the bayonet tab and lock of the rotor. The method may further include rotating the minidisk until the locking tab on the minidisk is aligned with a space separating a short tab and a long tab of the lock. The method may conclude with moving the minidisk in a second direction opposite to the first direction until the locking tab on the minidisk is positioned between the short tab and long tab of the lock.

In a refinement, the minidisk may be moved in the first direction until the minidisk comes in contact with the bayonet tab of the rotor.

In another refinement, the minidisk may be rotated until the locking tab on the minidisk comes into contact with the long tab of the lock.

In yet another refinement, the minidisk may be moved in the second direction until a second locking tab on the minidisk comes into contact with the bayonet tab of the rotor.

In still another refinement, the method may further include disassembling the rotor and minidisk. The method may include moving the minidisk in the first direction such that the locking tab of the minidisk is moved from between the short tab and long tab of the lock. The method may further include rotating the minidisk until the locking tab is aligned with the space separating the bayonet tab and the lock of the rotor. The method may conclude with moving the minidisk in the second direction to free the minidisk from the rotor.

In a further refinement, the minidisk may be moved in the first direction until the minidisk contacts the bayonet tab.

In another further refinement, the minidisk may be rotated until the locking tab contacts the long tab of the lock.

In accordance with yet another aspect of the disclosure, a gas turbine engine is disclosed. The gas turbine engine may include a compressor, a combustor downstream from the compressor, and a turbine downstream of the combustor. At least one of the compressor and turbine may include a rotor having a disk, a plurality of airfoils radially extending from the disk, a bayonet tab radially extending from the disk, and a lock radially extending from the disk. The lock may include a short tab and a long tab. The engine may further include a minidisk operatively associated with the rotor and having a first locking tab positioned between the short tab and long tab of the rotor.

In a refinement, the rotor may be a first stage of a turbine and the minidisk may be an air seal. The gas turbine engine may further include a compressor upstream from the turbine and the air seal may direct a flow of compressed air from the compressor to the turbine.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
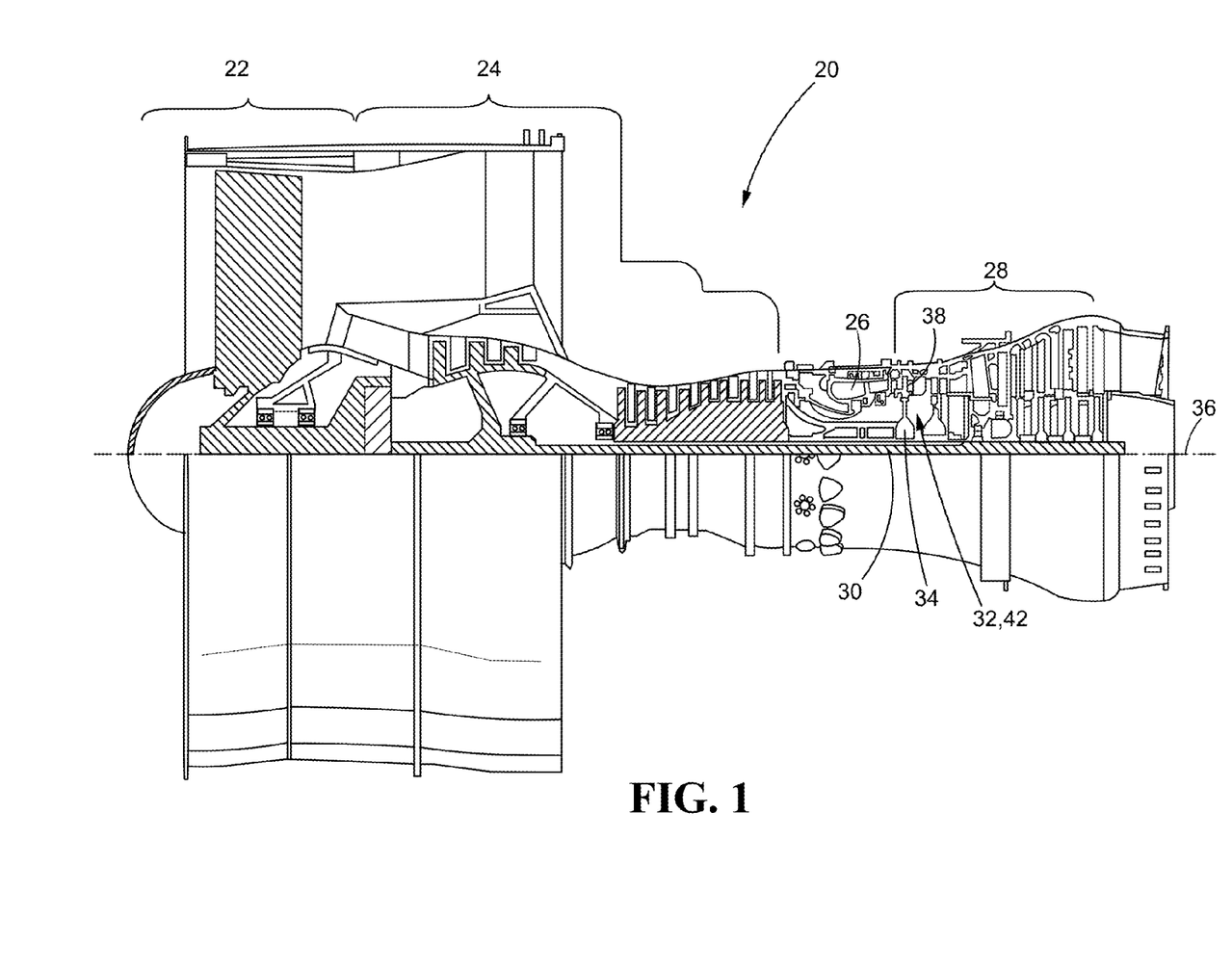
FIG. 1 is a cross-sectional view of a gas turbine engine constructed in accordance with an embodiment of the present disclosure.

Referring now to the drawings, and with specific reference to FIG. 1, a gas turbine engine 20 is illustrated. Gas turbine engines 20 typically include a plurality of axially aligned components, such as a fan 22, a compressor 24, a combustor 26, and a turbine 28. Ambient air is drawn in and accelerated by the fan 22 before flowing downstream to the compressor 24 to be compressed. The compressed air flows further downstream and is combined with a fuel and combusted at the combustor 26 forming an exhaust. The exhaust flows downstream from the combustor 26 to the turbine 28 where the exhaust expands, causing the turbine 28 to rotate. This rotational motion is transferred to the fan 22 and compressor 24 via an engine shaft 30 extending axially through the engine 20. The engine 20 illustrated in FIG. 1 is a dual spool engine having a high pressure and low pressure compressor 24 and turbine 26, each of which are linked by a separate engine shaft 30. This is only one possible configuration of the engine 20; however, and any engine configuration such as, but not limited to a single or triple spool engine is possible.

Figure 2:
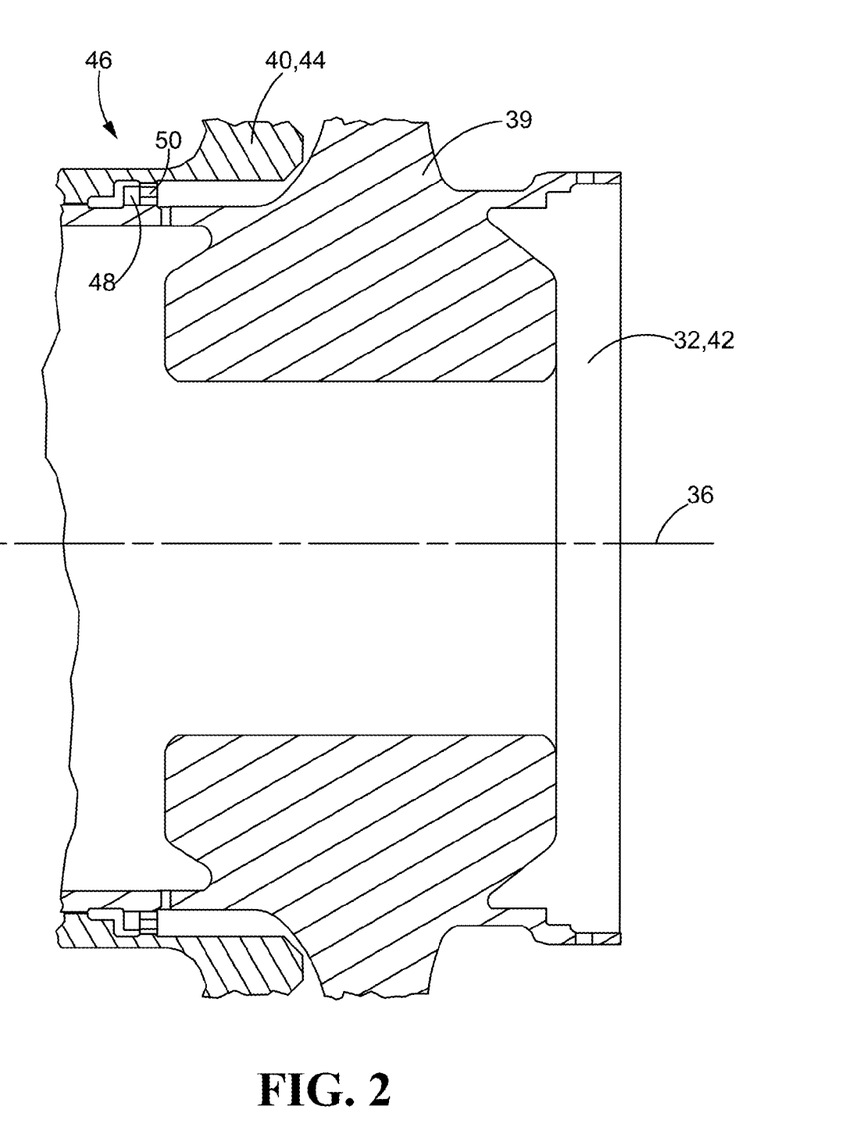
FIG. 2 is a cross-sectional view of a rotor and a minidisk constructed in accordance with the present disclosure.

Many rotors 32 such as the fan 22, compressor 24, and turbine 26 include a disk 34 having a central axis 36 and plurality of airfoils 38 radially extending from the disk 34. These rotors 32 may be associated with a minidisk 40 that is maintained stationary relative the rotor 32. The minidisk 40 may be provided in any number of different forms. For example, a first turbine stage 42, such as the one illustrated in FIG. 2 downstream of the combustor 26, is associated with an air seal 44, which directs compressed air from the compressor 24 to select areas of the turbine 28 for cooling purposes. In this example, the air seal 44 serves as the minidisk 40. A lock 46, such as a j-lock, and a bayonet tab 48 are provided on the disk 34 of the turbine stage 42 and engaged with a locking tab 50 on the air seal 44 to prevent the air seal 44 from moving with respect to the turbine stage 42 in one locking mechanism. The lock 46 and bayonet tabs 48 extend radially outward from the disk 34 in the illustrated example, but the lock 46 and bayonet tabs 48 may also extend radially inward in other embodiments.

Figure 3:
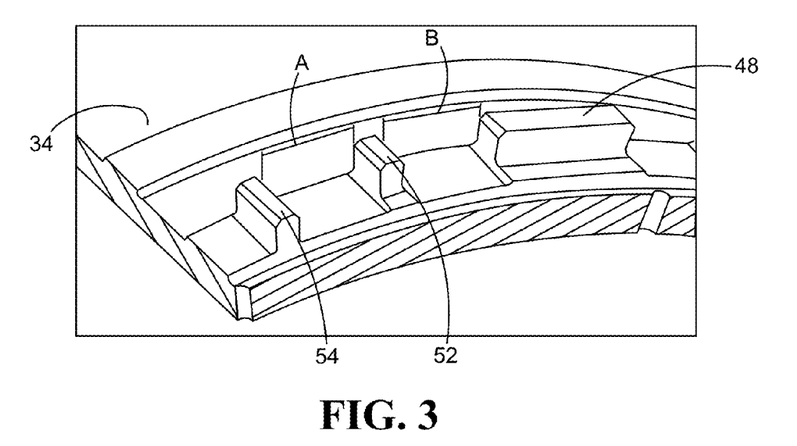
FIG. 3 is a perspective view of a rotor constructed in accordance with the present disclosure.

As can be seen best in FIG. 3, the lock 46 may include a short tab 52 and a long tab 54, the long tab 54 being characterized as having a greater axial length than that of the short tab 52 with respect to the central axis 36. In one embodiment, the short tab 52 also has a greater axial length than that of the bayonet tab 48; however, this is not a requirement for all embodiments. It is to be understood that the terms "short" and "long" as used herein, are therefore used only in a relative sense without reference to a specific dimension or range of dimensions.

Figure 4:
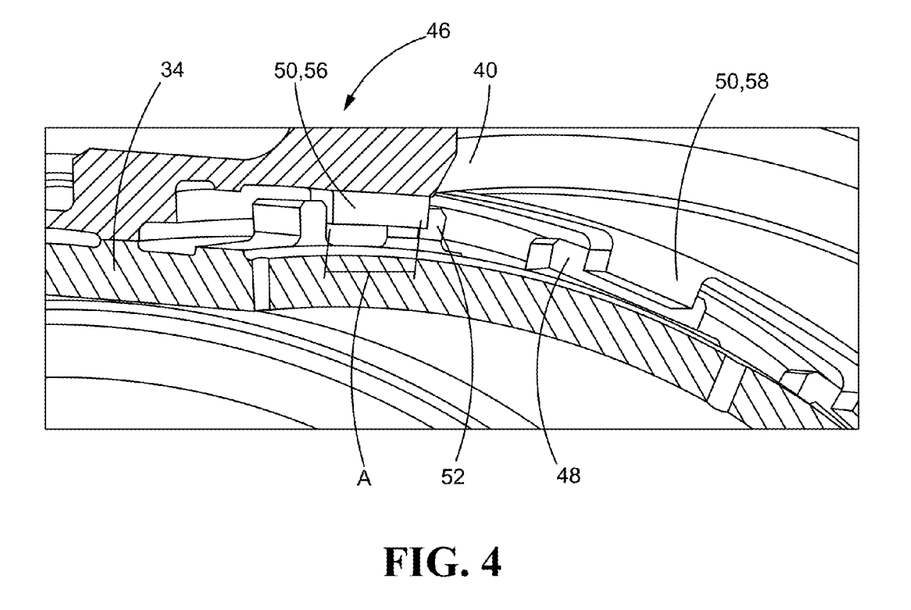
FIG. 4 is a perspective view of another rotor and minidisk constructed in accordance with the present disclosure and in a partially assembled state.
Figure 5:
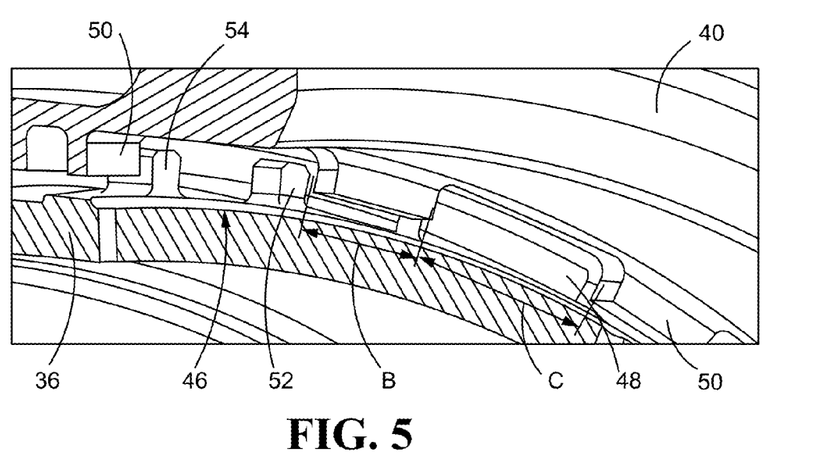
FIG. 5 is a perspective view of the rotor and minidisk of FIG. 3 in another partially assembled state.

As illustrated in FIG. 4, a circumferential distance A around the disk 34 of the rotor 32 separating the short and long tabs 52, 54 is greater than a circumferential length of the locking tabs 50 to allow the locking tab 50 to be positioned between the short and long tabs 52, 54. Similarly, a circumferential distance B around the disk 34 of the rotor 32 separating the short tab 52 of the lock 46 from the bayonet tab 48 is greater than the circumferential length of the locking tab 50 to allow the locking tab 50 to move between the lock 46 and bayonet tab 48 during assembly and disassembly, as illustrated in FIG. 5 and described in further detail below. In one embodiment, the distances A and B are equal; however, this is in no way limiting and any ratio between the distances A and B is possible. Further illustrated in FIG. 5, a circumferential distance C around the minidisk 40 between each locking tab 50 is greater than a circumferential length of the bayonet tab 48. The distance C allows for the bayonet tabs 48 to pass between the locking tabs 50 during assembly and disassembly, as described further below.

As can be seen in FIGS. 4 and 5, the minidisk 40 may have two locking tabs 50, which interact with the lock 46 and bayonet tab 48 to prevent the undesirable relative movement. Specifically, a first locking tab 56 may be retained in the lock 46 between the short and long tabs 52, 54, to prevent the minidisk 40 from rotating with respect to the rotor 32, while a second locking tab 58 may be retained by the bayonet tab 48, to prevent the minidisk 40 from moving axially away from the rotor 32. Of course, in other embodiments, a different number of locking tabs is possible.

Figure 6:
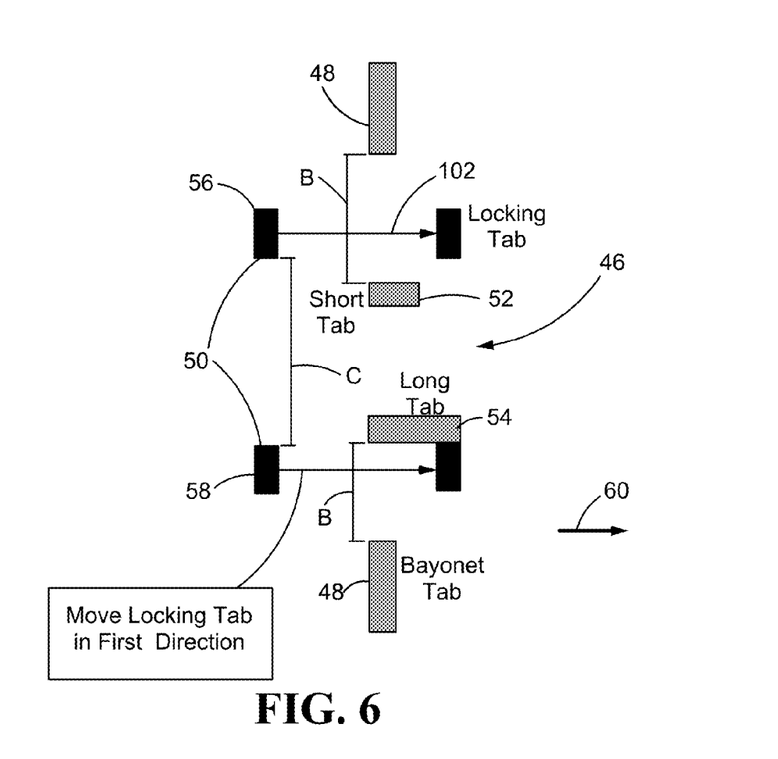
FIG. 6 is a schematic diagram detailing a first and second step of assembling of a lock constructed in accordance with an embodiment of the present disclosure.

The assembly process of the present disclosure will now be described with reference to the schematics of FIGS. 6-8, and the flow chart of FIG. 12. To begin the assembly of a minidisk 40 with a rotor 32 having the described lock 46 and bayonet tabs 48, a pair of locking tabs 50, extending from the minidisk 40, are aligned with a space separating the lock 46 from the bayonet tabs 48 positioned to either side of the lock 46 in a first step 100. This space between the lock 46 and bayonet tabs 48 is marked distance B in FIG. 6. This alignment is illustrated in FIG. 6 as the first placement of the locking tabs 50. In a step 102 also illustrated in FIG. 6, the locking tabs 50 are moved in a first direction 60 between the lock 46 and the bayonet tabs 48. This movement in the first direction 60 may cause the minidisk 40 to contact the bayonet tabs 48. Such contact may prevent any further movement of the minidisk 40 and alert an operator that the locking tabs 50 are in the proper position.

Figure 7:
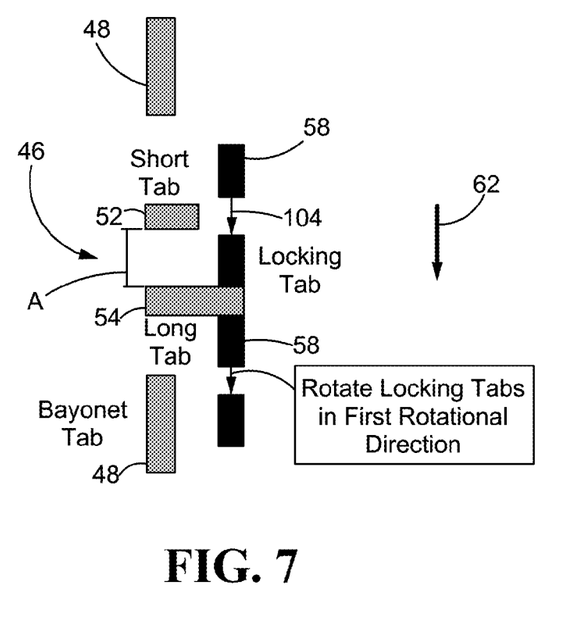
FIG. 7 is a schematic diagram detailing a third step of assembling a lock constructed in accordance with an embodiment of the present disclosure.
Figure 8:
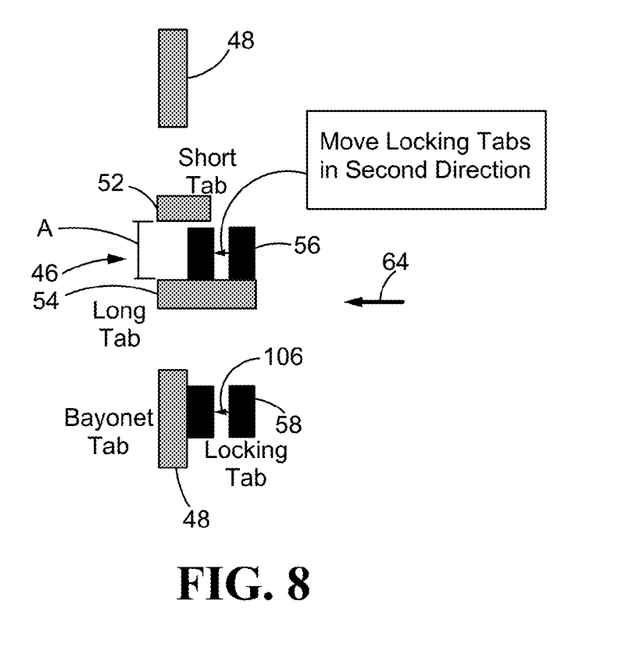
FIG. 8 is a schematic diagram detailing a fourth step of assembling a lock constructed in accordance with an embodiment of the present disclosure.

In a step 104 illustrated in FIG. 7, the minidisk 40 is rotated in a first rotational direction 62 until the first locking tab 56 is aligned with the space separating the short and long tabs 52, 54 of the lock 46 marked distance A. In the same movement, the second locking tab 58 is aligned with one of the bayonet tabs 48. This rotation of the minidisk 40 may cause the first locking tab 56 to contact the long tab 54 of the lock 46. Such contact may prevent the minidisk 40 from rotating further and alert the operator that all locking tabs 50 are in the correct position.

In a step 106, the minidisk 40 is then moved in a second direction 64, opposite the first direction 60, until the first locking tab 56 is positioned between the short and long tabs 52, 54 of the lock 46. This movement of the minidisk 40 may result in the second locking tab 58 contacting one of the bayonet tabs 48. This contact may prevent the minidisk 40 from any further movement in the second direction 64 and alert the operator that the locking tabs 50 are in the correct position, as well as that the assembly is complete.

In this assembled position, the minidisk 40 is prevented from rotating relative the rotor 32 by the short and long tabs 52, 54 of the lock 46. Movement in the second direction 64 is also prevented by the bayonet tabs 50. Movement in the first direction 60 is further limited by the bayonet tabs 50 interacting with the minidisk 40, similarly to the step 102.

Figure 9:
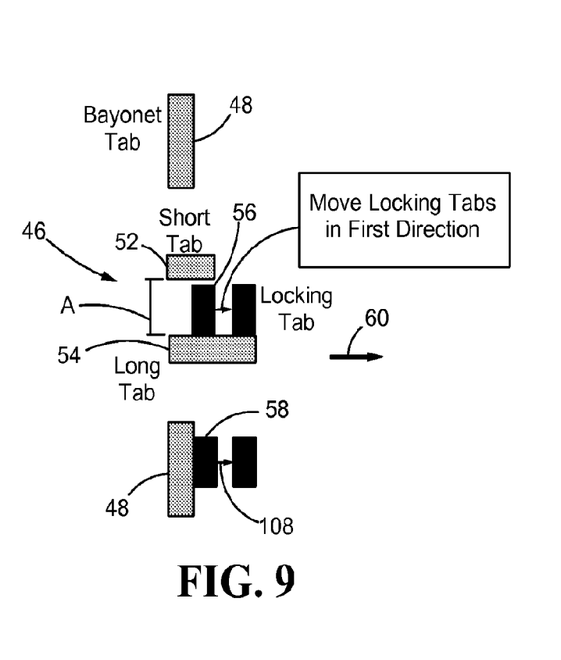
FIG. 9 is a schematic diagram detailing a first step of disassembling a lock constructed in accordance with an embodiment of the present disclosure.
Figure 10:
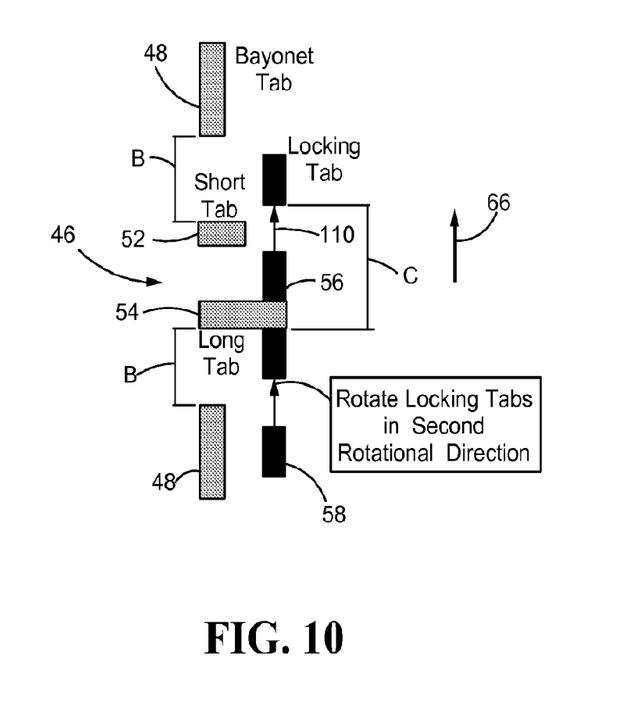
FIG. 10 is a schematic diagram detailing a second step of disassembling a lock constructed in accordance with an embodiment of the present disclosure.
Figure 11:
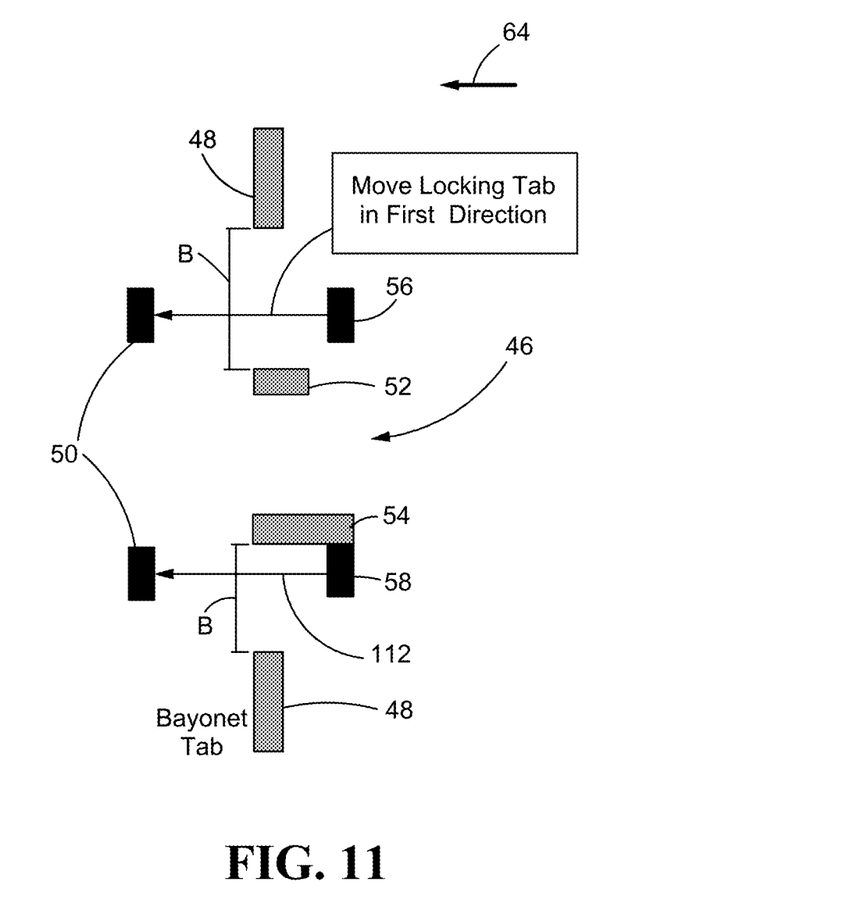
FIG. 11 is a schematic diagram detailing a third step of disassembling a lock constructed in accordance with an embodiment of the present disclosure.
Figure 12:
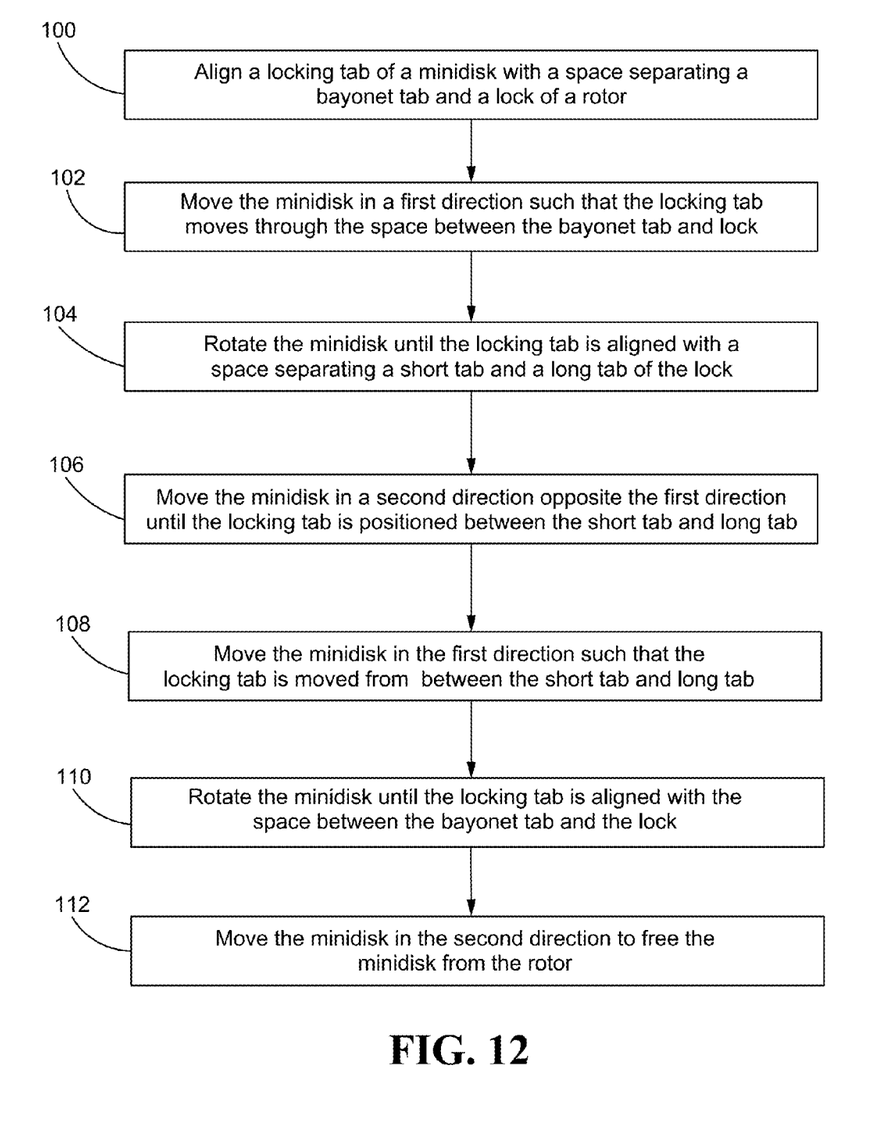
FIG. 12 is a flow chart detailing the sequential steps of assembly and disassembly of a lock constructed in accordance with an embodiment of the present disclosure.

Turning now to the disassembly of the rotor 32 and minidisk 40, FIGS. 9-11 illustrate the disassembly in step-by-step progression, and FIG. 12 details the disassembly as a continuation of the assembly steps in a flow chart. In a step 108 illustrated in FIG. 9, the minidisk 40 is moved in the first direction 60, such that the first locking tab 56 moves from between the short and long tabs 52, 54; this space is marked distance A. In the same movement, the second locking tab 58 moves away from one of the bayonet tabs 48. This movement of the minidisk 40 may cause the minidisk 40 to contact the bayonet tabs 48. Such contact may prevent the minidisk from moving further in the first direction 60 and alert the operator that the locking tabs 50 are in the correct position.

In a step 110 illustrated in FIG. 10, the minidisk 40 is rotated in a second rotational direction 66, opposite the first rotational direction 62, until the locking tabs 50 are aligned with the space separating the lock 46 and the bayonet tabs 48, marked distance B. The rotation of the minidisk 40 in the second rotational direction 66 may cause the second locking tab 58 to contact the long tab 54 of the lock 46. Such contact may prevent further rotation of the minidisk 40 in the second rotational direction 66 and alert the operator that the locking tabs 50 are correctly aligned.

In a step 112 illustrated in FIG. 11, the minidisk 40 is then moved in the second direction 62 such that the locking tabs 50 move between the bayonet tabs 48 and the lock 46, the space marked by distance B. Once the locking tabs 50 have cleared the bayonet tabs 50 and the lock 46 the minidisk 40 may be freely moved.

In many cases specialized equipment may be necessary to move and rotate the minidisk 40 during assembly and disassembly. This may be due to a heavy weight of the rotor 32 and minidisk 40 or due to a tight fitting between the rotor 32 and minidisk 40. Both the weight and tight fitting may also help to secure the minidisk 40 in place relative the rotor 32.

Many of the figures illustrate the lock 46 and bayonet tabs 48 extending radially outward from the disk 34 of the rotor 32, specifically FIGS. 1-4. However, it is envisioned that in some embodiments, the lock 46 and bayonet tabs 48 may extend radially inward from the disk 34 of the rotor 32. Such a positioning of the lock 46 and bayonet tabs 48 would further require the locking tabs 50 to extend radially outward from the minidisk 40. Further, the rotor 32 may include any number of locks 46 and bayonet tabs 48. The bayonet tabs 48 and locks 46 may be evenly spaced about the rotor 32 in cases where the orientation of the rotor 32 and minidisk 40 are not as important. The bayonet tabs 48 and locks 46 may alternatively be concentrated in one area of the rotor 32 to necessitate a fixed orientation of the rotor 32 and minidisk 40 before assembly. The minidisk 40 may include at least one locking tab 50 for each lock 46 and at least one other locking tab 50 to interact with the bayonet tab 48. The locking tabs may be evenly spaced about the minidisk 40 to allow the minidisk 40 and rotor 32 to be assembled simply, or the locking tabs 50 may be concentrated in particular areas of the minidisk 40, requiring a particular orientation of the minidisk 40 relative the rotor 32.

Figure 13:
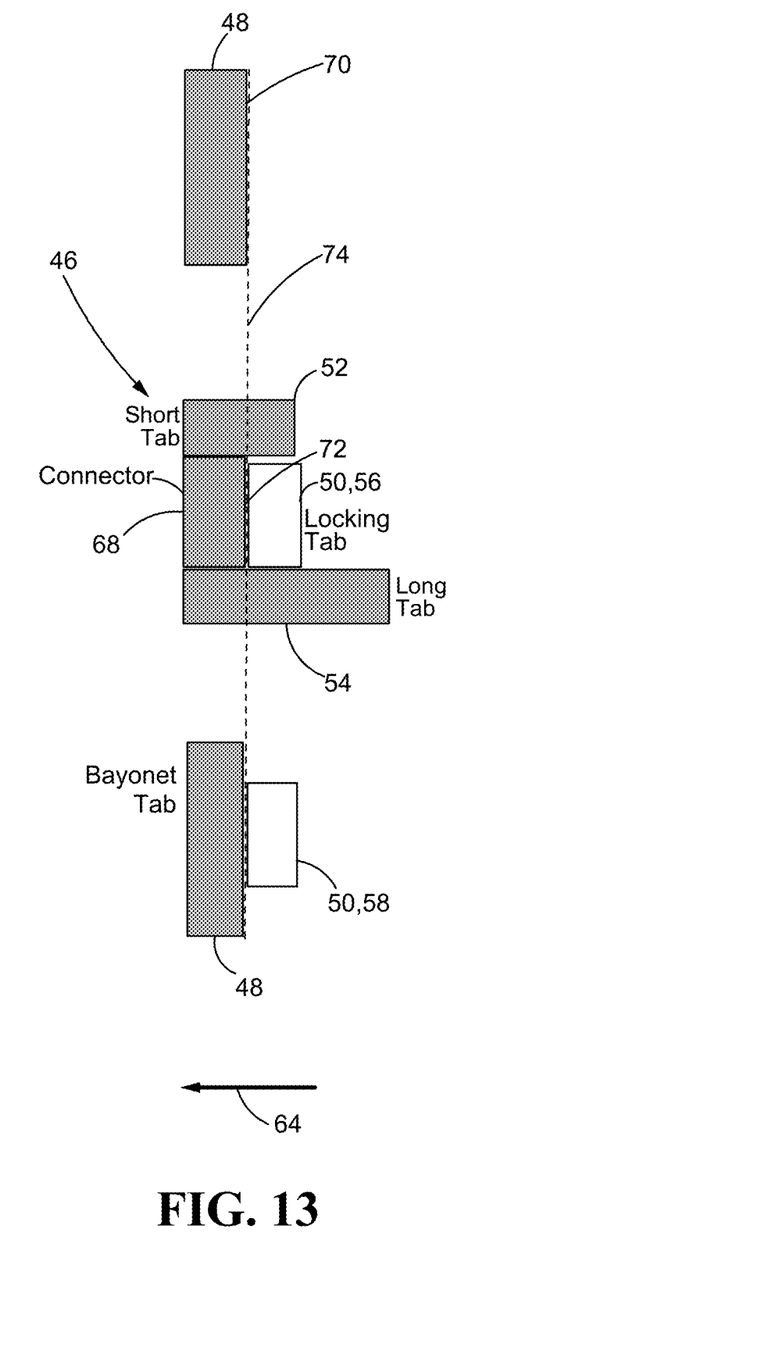
FIG. 13 is a schematic diagram detailing an assembled position of a lock constructed in accordance with an embodiment of the present disclosure.

While the foregoing has described the j-lock 46 as being separated by a distance A, an alternative configuration exists as illustrated in FIG. 13. The short tab 52 and long tab 54 may be joined by a connector 68. This connector 68 may function similar to the bayonet tab 48 to prevent disengagement of the minidisk 40 from the rotor 32 in the second direction 64. The connector 68 and bayonet tab 48 may be positioned such that a face 70 of the bayonet tab 48 and a face 72 of the connector 68 lie in a plane 74. The faces 70 and 72 may contact the locking tab 50 during step 106 as shown in FIG. 13.

INDUSTRIAL APPLICABILITY

From the foregoing, it can be seen that the technology disclosed herein has industrial applicability in a variety of settings such as, but not limited to securing air seals to a first stage turbine of a gas turbine engine. The lock presented herein prevents the air seal from rotating or moving axially with respect to the turbine stage without requiring additional attachments or locks as in previous locking mechanisms. This reduces part count and weight of the engine, which are both beneficial in an aircraft.

While the present disclosure has been made in reference to a turbine of a gas turbine engine for use with an aircraft, one skilled in the art will understand that the teachings herein can be used in other applications as well, such as for any rotor which requires an attached minidisk to not move in relation to the rotor, for example. It is therefore intended that the scope of the invention not be limited by the embodiments presented herein to set forth the best mode currently known for carrying out the invention, but rather that the invention includes all equivalents falling within the spirit and scope of the appended claims as well.

What is claimed is:

1. An assembly, comprising;
   a rotor, comprising:
   a disk having a central axis;
   an airfoil radially extending from the disk;
   a bayonet tab extending radially from the disk; and
   a lock having a short tab and a long tab, the short and long tabs extending radially from the disk with respect to the central axis and in an axial direction with respect to the central axis, the long tab having a first axial length and the short tab having a second axial length, wherein the first axial length is greater than the second axial length, and
   a minidisk operatively associated with the rotor, the minidisk including a first locking tab formed thereon;
   wherein the first locking tab on the minidisk aligns with a first space separating the bayonet tab and the lock of the rotor;
   wherein the minidisk moves in a first direction such that the first locking tab of the minidisk moves through the first space separating the bayonet tab and the lock of the rotor;
   wherein the minidisk rotates until the first locking tab on the minidisk aligns with a second space separating the short tab and the long tab of the lock; and
   wherein the minidisk moves in a second direction opposite to the first direction until the first locking tab on the minidisk is positioned between the short tab and the long tab of the lock.

2. The rotor of claim 1, wherein the second axial length of the short tab of the lock is greater than an axial width of the bayonet tab.

3. The rotor of claim 1, wherein a first circumferential distance around the disk separating the bayonet tab and the lock is equal to a second circumferential distance around the disk separating the short tab and the long tab of the lock.

4. The rotor of claim 1, wherein the bayonet tab, the short tab, and the long tab extend radially outward from the disk of the rotor with respect to the central axis.

5. The rotor of claim 1, wherein a plurality of the locks are evenly distributed about the circumference of the disk.

6. The rotor of claim 1, wherein a plurality of the bayonet tabs are evenly distributed about the circumference of the disk.

7. The rotor of claim 1, wherein the minidisk has a second locking tab proximate the bayonet tab of the rotor.

8. The rotor of claim 1, wherein a plurality of the locking tabs are evenly distributed about the circumference of the minidisk.

9. The rotor of claim 1, wherein the rotor is a turbine of a gas turbine engine and the minidisk is an air seal.

10. The rotor of claim 1, wherein the lock further includes a connector spanning between and joining the short and long tabs of the lock.

11. A method of assembling a rotor and a minidisk, comprising:
    aligning a first locking tab on the minidisk with a first space separating a bayonet tab and a lock of the rotor, the lock of the rotor comprising a short tab and a long tab;
    moving the minidisk in a first direction such that the first locking tab of the minidisk moves through the first space separating the bayonet tab and the lock of the rotor;
    rotating the minidisk until the first locking tab on the minidisk is aligned with a second space separating the short tab and the long tab of the lock of the rotor; and
    moving the minidisk in a second direction opposite to the first direction until the first locking tab on the minidisk is positioned between the short tab and the long tab of the lock of the rotor.

12. The method of claim 11, wherein the minidisk is moved in the first direction until the minidisk comes in contact with the bayonet tab of the rotor.

13. The method of claim 11, wherein the minidisk is rotated until the first locking tab on the minidisk comes into contact with the long tab of the lock of the rotor.

14. The method of claim 11, wherein the minidisk is moved in the second direction until a second locking tab on the minidisk comes into contact with the bayonet tab of the rotor.

15. The method of claim 11, further including disassembling the rotor and the minidisk; moving the minidisk in the first direction such that the first locking tab of the minidisk is moved from between the short tab and long tab of the lock; rotating the minidisk until the first locking tab is aligned with the first space separating the bayonet tab and the lock of the rotor; and moving the minidisk in the second direction to free the minidisk from the rotor.

16. The method of claim 15, wherein the minidisk is moved in the first direction until the minidisk contacts the bayonet tab.

17. The method of claim 15, wherein the minidisk is rotated until the first locking tab contacts the long tab of the lock.

18. A gas turbine engine, comprising:

a compressor;

a combustor downstream of the compressor;

a turbine downstream of the combustor, wherein at least one of the compressor and the turbine includes a rotor including a disk, a plurality of airfoils radially extending from the disk, a bayonet tab radially extending from the disk, a lock radially extending from the disk, and the lock including a short tab and a long tab, and a minidisk operatively associated with the rotor, the minidisk including a first locking tab positioned between the short tab and the long tab of the lock; and wherein the first locking tab on the minidisk aligns with a first space separating the bayonet tab and the lock of the rotor;

wherein the minidisk moves in a first direction such that the first locking tab of the minidisk moves through the first space separating the bayonet tab and the lock of the rotor;

wherein the minidisk rotates until the first locking tab on the minidisk aligns with a second space separating the short tab and the long tab of the lock; and wherein the minidisk moves in a second direction opposite to the first direction until the first locking tab on the minidisk is positioned between the short tab and the long tab of the lock.

19. The gas turbine engine of claim 18, wherein the rotor is a first stage of the turbine and the minidisk is an air seal directing a flow of compressed air from the compressor to the turbine.

* * * * *